(12) United States Patent
Panikkar

(10) Patent No.: US 12,443,683 B2
(45) Date of Patent: Oct. 14, 2025

(54) EDGE CONFIGURATION AWARE LICENSE KEY

(71) Applicant: Dell Products L.P., Round Rock, TX (US)

(72) Inventor: Shibi Panikkar, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 229 days.

(21) Appl. No.: 18/343,027

(22) Filed: Jun. 28, 2023

(65) Prior Publication Data

US 2025/0005112 A1    Jan. 2, 2025

(51) Int. Cl.
   *G06F 21/10*   (2013.01)
   *G06F 21/12*   (2013.01)

(52) U.S. Cl.
   CPC ........ *G06F 21/105* (2013.01); *G06F 21/1082* (2023.08); *G06F 21/125* (2013.01)

(58) Field of Classification Search
   CPC .... G06F 21/105; G06F 21/107; G06F 21/125; G06F 21/1082

USPC ......................................................... 713/100
See application file for complete search history.

(56) References Cited

U.S. PATENT DOCUMENTS

| | | | |
|---|---|---|---|
| 11,244,267 B2 * | 2/2022 | Panikkar ............ | G06Q 10/0633 |
| 2022/0231846 A1 * | 7/2022 | Panikkar ............... | H04L 9/3236 |
| 2024/0380590 A1 * | 11/2024 | Panikkar ............... | H04L 9/3073 |

* cited by examiner

*Primary Examiner* — Brian T Misiura
(74) *Attorney, Agent, or Firm* — Amin, Turocy & Watson, LLP

(57) ABSTRACT

Edge configuration aware license key generation is presented herein. An example method comprises, in response to downloading an intelligent activation key, instantiating an edge configuration engine comprising a listening process and a configuration process, creating and associating a license file vault instance with the edge configuration engine, initiating the listening process, and based on the listening process detecting that a change has occurred with the license file vault, initiating the configuration process, wherein the configuration process configures edge computing equipment to retrieve enabling data used to activate a product associated with the intelligent activation key and enumerated in the license file vault.

20 Claims, 14 Drawing Sheets

```
{
  "EsgeSettings": {                              ← 900
    "ProductID": "ER8RSS",        ← 902
    "Register": {
      "ProductID": "ER8RSS",
      "ProductDescription" : "To Store the Backup Data",
904→  "FeaturesEnbled" : {
        "Feature1",
        "Feature2"
      },
906→  "MachineIdentifier":"5PDU7Q",
      "DataCollected":"BackupData",
908→  "UOM":"MegaBytes",
      "Country":"India"
    },
         ← 910
    "Telemetry": {      ← 912
      "Diskusage" : {
        "UOM": "MB",
        "SourceToCollect":"Protocol://Port/EndURL"
      }, ← 914
      "MemoryUsage": {
        "UOM": "MB",
        "SourceToCollect":"Protocol://Port/EndURL"
      }
    },
    "Policy": {
      "CustomerConsensus" : "Signed",  ← 916
      "MaxBackup" : "1 TB"
                      ← 918
```

FIG. 9

```
"Register":({
    "ProductID": "ER8RSS",
    "ProductDescription": "To Store the Backup Data",
    "FeaturesEnabled":{
        "Feature1",
        "Feature2"
    },
    "MachineIdentifier": "SP0U7Q",
    "DataCollected": "BackupData",
    "UOM": "MegaBytes",
    "Country": "India"
}
```

```
"Telemetry":{
    "DiskUsage" : {
        "UOM": "MB",
        "SourceToCollect":"Protocol://Port/EndURL"
    },
    "MemoryUsage" : {
        "UOM": "MB",
        "SourceToCollect":"Protocol://Port/EndURL"
    },
```

```
"policy":{
"CustomerConsensus" : "Signed",
"MaxBackup" : "1 TB"
```

EDGE CONFIGURATION AWARE LICENSE KEY

BACKGROUND

Edge computing equipment can provide entry points into enterprise or service provider core networks. Generally, edge computing equipment can comprise routing equipment, network switching equipment, multiplexer equipment, integrated access equipment, and the like. Typically, edge computing equipment can be outward facing, providing authenticated access to faster, more efficient core network equipment. As can be appreciated, the faster, more efficient core network equipment can represent devices and components associated with segments of internal and/or external cloud networks.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 7 illustrates an intelligent activation key for generating and supplying edge configuration aware license keys for use by resource sharing server equipment, in accordance with various non-limiting example embodiments.

FIG. 8 illustrates an encrypted second block of the intelligent activation key for generating and supplying edge configuration aware license keys for use by resource sharing server equipment, in accordance with various non-limiting example embodiments.

FIG. 9 illustrates an example decryption of the encrypted second block of the intelligent activation key comprising the edge configuration coding for generating and supplying edge configuration aware license keys for use by resource sharing server equipment, in accordance with various non-limiting example embodiments.

FIG. 10 depicts example settings and sub-code for a first action included in the edge configuration coding for generating and supplying edge configuration aware license keys for use by resource sharing server equipment, in accordance with various non-limiting example embodiments.

FIG. 11 depicts example settings and sub-code for a second action included in the edge configuration coding for generating and supplying edge configuration aware license keys for use by resource sharing server equipment, in accordance with various non-limiting example embodiments.

FIG. 12 depicts example settings and sub-code for a third action included in the edge configuration coding for generating and supplying edge configuration aware license keys for use by resource sharing server equipment, in accordance with various non-limiting example embodiments.

DETAILED DESCRIPTION

Figure 1:
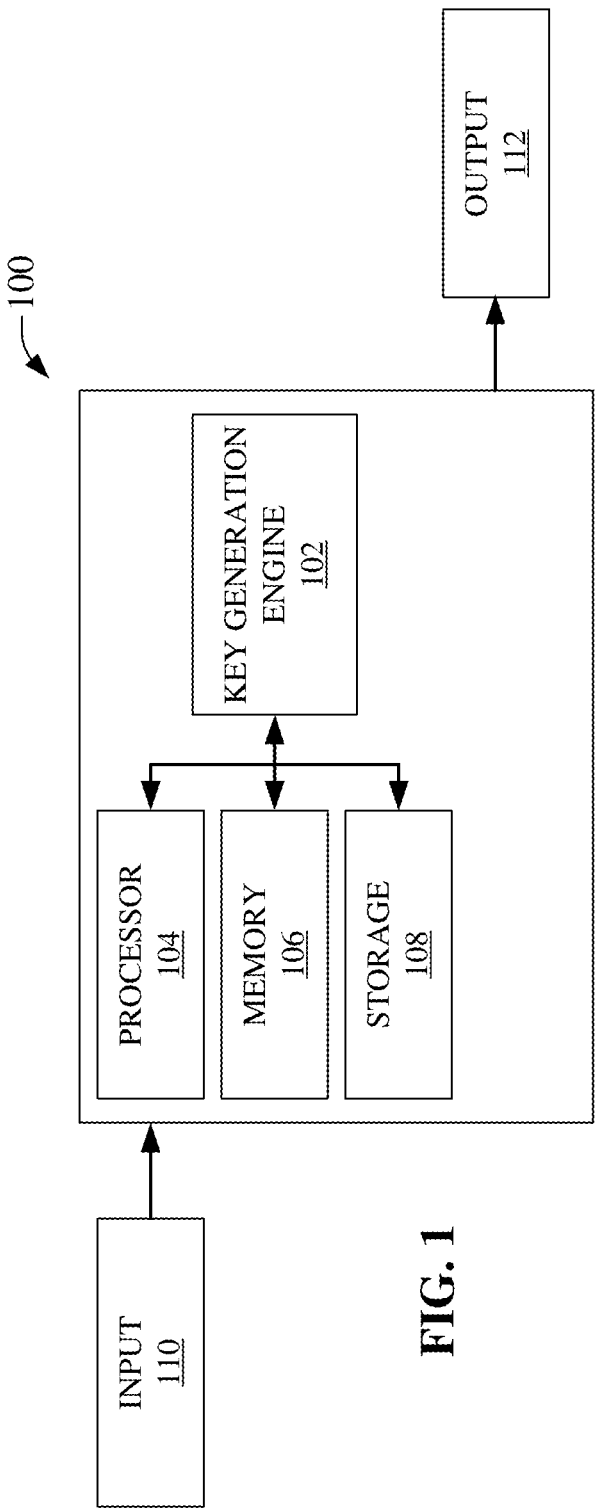
FIG. 1 illustrates a block diagram of a system for generating and supplying edge configuration aware license keys for use by resource sharing server equipment, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The subject disclosure generally relates to embodiments for the provision of product keys, software keys, serial keys, and/or activation key. In this regard, by way of further background, with the advent of advanced networking paradigms, such as fifth generation (5G) and/or sixth generation (6G) Long Term Evolution (LTE) telecommunication implementation standards (and their associated various improvements, iterations, and versions), edge computation has become increasingly more important in the context of enterprise wide resource sharing, such as the sharing of central processor units (CPU) with enhanced availability, response times, processing speeds, channel capacity, bandwidth, and throughput, but generally with low latencies, power consumption, and environmental impact. Other resource sharing equipment and/or paradigms that are moving toward the use of edge computation can include the sharing of resources associated with software as a service (SaaS), Infrastructure as a Service (IaaS), Platform as a Service (PaaS), managed software as a service (MSaaS), mobile backend as a service (MBaaS), data center as a service (DCaaS), integration platform as a service (iPaaS), and/or information technology management as a service (ITMaaS). Additional resource sharing equipment can also pertain to the sharing of memory resources, disk storage capacities, and the like.

As a lot of business functionalities (e.g., the management, control, monitoring and/or execution of SaaS, IaaS, PaaS, MSaaS, MBaaS, DCaaS, iPaaS, and/or ITMaaS) are being gradually shifted to edge computing components and/or equipment rather than being managed controlled, monitored, and/or executed in the networked cloud, the complexity of configuring edge computing equipment is increasing. Previously, configuration of edge computing equipment had been a one-time effort. Now, however, with each business functionality being shipped to a client or customer, especially where the business functionality is subscription based, edge computing equipment configuration has administratively become manifestly more complex and time consuming, as each subscription based business functionality on offer can, for instance, require unique configurations with respect to the business product on offer and in relation to the unique circumstances associated with the individual customer and/or client.

Currently, edge server equipment setup and configuration in relation to resource sharing equipment, in some embodiments, has entailed sending individuals or groups of individuals to a customer and/or client site location to perform the setup and configuration of edge server equipment and associated resource sharing equipment. Where the customer and/or client operates in multiple diverse geographic locations, for consistency of resource sharing equipment (and/or edge server equipment) setup and/or configuration, a single experienced team of individuals or multiple teams of trained individuals, at great cost, have had to be sent disparate customer or client sites.

In alternative and/or additional embodiments, concerning the setup and configuration of edge server equipment and/or resource sharing equipment, automatic setup and configuration of resource sharing equipment has to date been facilitated by each business product suite on offer being specifically coded to configure the various functionalities and facilities comprising edge computing equipment associated with delivered resource sharing equipment and/or extant resource sharing equipment currently at the customer/client location (e.g., geographic site). The issue with the foregoing configuration modality lies in that each time there is a update to the setup and configuration of the business product suite operating on the resource sharing equipment and/or there is an amendment or change to the setup and configuration of the edge computing equipment, another bespoke encoded automatic setup and configuration package needs to be generated and dispatched to the customer or client so that the business product suite can resume functionality.

In still yet further alternative and/or additional embodiments, there currently are instances where despite the specifically encoded automatic setup and configuration data being transmitted or dispatched to the resource sharing equipment and/or extant edge computing equipment, the automatic setup and configuration data, upon execution, is unable to call home (e.g., to outward facing original equipment manufacturer (OEM) equipment configured to particularly respond to queries concerning the dissemination of automatic setup and configuration data; such an outward facing original equipment manufacturer (OEM) equipment can itself be one of a plurality of edge computing equipment used to facilitate these tasks) to retrieve and/or access additional edge computing equipment configuration details to appropriately install and/or configure one or more of the resource sharing equipment and/or the edge computing equipment. In some instances under this head, call backs to retrieve and/or access further edge computing equipment configuration information may not be possible as the customer/client may be a dark site customer/client where no outward facing Internet access is permissible, and as such, access, installation, and configuration of the business product suite(s) operational on the resource sharing equipment, and/or access, installation, setup, and/or configuration of the edge computing equipment may be severely constrained, if not impossible.

In yet further alternative and/or additional embodiments, there are currently examples where software agents can be shipped together with the resource sharing equipment (and if necessary, associated edge computing equipment) that, upon execution, can be utilized to call home to obtain the additional edge computing equipment configuration details necessary to install and configure both the shipped resource sharing equipment and/or the edge computing equipment. However, the use of software agents can also succumb to the need to retrieve and/or access additional installation and/or configuration data associated with configuring and installing the resource sharing equipment and/or configuring the edge computing equipment at the client/customer site, this situation can be particularly evident where the client/customer installation is a dark site where there generally is no outward facing infrastructure to enable a call back to the OEM equipment.

Most commercially produced software and/or hardware products can require activation keys to unlock and enable the multitude of functionalities associated with such products. Activation keys are typically shipped with commercially developed products. The basis of this disclosure thus lies in generating unique activation keys that are sufficiently intelligent such that a supplied activation key both enables the licensed features associated with the product (e.g., resource sharing equipment that provides disk storage and customized software packages that can enable the facilities and/or functionalities associated with the resource sharing equipment) as well as configuring and enabling associated edge computing equipment so that the shipped (or extant) product facilitates additional configurations to itself. By employing activation keys to both enable licensed features associated with the product, and setup and configure associated edge computing equipment to cooperate with the product (e.g., resource sharing server equipment), the necessity for including additional agents and setup scripts can be dispensed with entirely. For instance, with regard to customers/clients that operate as dark sites (e.g., sites that are isolated from the general internet) an intelligent activation key can both enable the licensed features associated with the shipped product as well as configuring associated edge computing equipment, albeit temporarily for the duration of the installation of the product, so that additional product related setup and configuration data and updated data associated with the product can be used to complete the installation and configuration of the product.

In order to achieve an intelligent activation key (e.g., also referred to as an intelligent license key, intelligent product key, intelligent software key, . . . ) that will both contemporaneously enable one or more licensed feature associated with the shipped product (e.g., resource sharing server equipment) as well as configure (in some implementations temporarily) associated edge computing equipment, the disclosed intelligent activation key can comprise aggregations of block data, wherein, for example, first block data can be associated with activating one or more licensed feature associated with the shipped product (and/or updating one or more licensed feature of an extant previously shipped product), and second block data can, for example, be associated with configuring associated edge computing equipment.

In the context of the following disclosure, without loss of generality, the subject disclosure can be understood in the context of storage sharing server equipment (or storage equipment) that can comprise many thousands of petabytes of storage (e.g., data storage). The described storage sharing equipment can be used, in some embodiments, for long term file archival, storage of computer readable and/or machine-readable instructions for a plethora of disparate software application products, supplemental disk capacity for transient/temporary storage (e.g., used for virtual machine implementations), and the like. Nevertheless, it will be understood that the disclosure set forth herein can have applicability to other resource sharing endeavors and/or licensing of products such as software and/or hardware.

The disclosed systems and methods, in accordance with various embodiments, provide a system, apparatus, or device comprising: a processor; and a memory that stores executable instructions that, when executed by the processor, facilitate performance of operations. The operations can comprise: in response to receiving, from original equipment manufacturer networking equipment, notification to download an intelligent activation key, downloading the intelligent activation key, and activating the intelligent activation key, wherein the activating of the intelligent activation key facilitates: starting, on edge computing equipment, an edge configuration engine comprising a listening process and a configuration process, and creating and associating a license file vault instance with the edge configuration engine, initiating, on the edge computing equipment, the listening process; and in response to the listening process detecting an occurrence representing a change to the license file vault instance, initiating, on the edge computing equipment, the configuration process.

Concerning the foregoing the edge configuration engine can be a virtual machine instantiation. Additionally, the intelligent activation key can comprise a first encrypted block of data representing product license data and a second encrypted block of data representing edge configuration data, and wherein the configuration process uses a first pair of encryption key values to decrypt the first encrypted block of data to obtain the product license data and a second pair of encryption key values to decrypt the second encryption block of data to obtain the edge configuration data. The first pair of encryption key values and the second pair of encryption key values can be bundled with the intelligent activation key. Moreover, the edge configuration data can comprise customized executable code fragments comprising a collection of actions that are performed by the configuration process, such that when the configuration process reads the edge configuration data it can execute an action representing a directive to register the product license data and associate the product license data with the license file vault. Further, the collection of actions performed by the configuration process can include an action to start processes, based on telemetry data associated with the action, to acquire, via the edge computing equipment, additional data to enable execution of a product associated with the product license data. In accordance with this aspect, the edge computing equipment facilitates communication with the original equipment manufacturer network equipment. Other actions can also include an action to obtain an electronic signature from a user representative identity associated with a customer entity, and thereafter return the electronic signature to the original equipment manufacturer equipment, and an action to limit or curtail backup of the product to a defined disk space backup size.

In accordance with further embodiments, the subject disclosure describes a method, comprising a series of acts that can include: receiving, by a device comprising a processor, a notification trigger to download an intelligent activation key, in response to the notification trigger, downloading, by the device, the intelligent activation key; and activating, by the device, the intelligent activation key, wherein the activating of the intelligent activation key facilitates: starting, on edge computing equipment, an edge configuration engine comprising a listening process and a configuration process, and creating and associating a license file vault instance with the edge configuration engine, initiating, on the edge computing equipment, the listening process, and in response to the listening process detecting an occurrence representing a change to the license file vault instance, initiating, on the edge computing equipment, the configuration process.

In relation to the foregoing, the notification trigger can have been generated and sent by original equipment manufacturer network equipment, wherein the original equipment manufacturer network equipment can be accessible via a public internet network infrastructure, while the device and the edge computing equipment can be associated with a dark site equipment operator entity, wherein a dark site associated with the dark site equipment operator can be inaccessible to a public internet network infrastructure.

Moreover, with concern to the foregoing, the intelligent activation key can comprise a first encrypted data block, a second encrypted data block, and a group of paired and associated encryption key values, wherein the configuration process, using a paired and associated encryption key value of the group of paired and associated key values, can decrypt the second encrypted data block and obtain edge configuration data comprising customized and executable code segments. The customized and executable code segments can be representative of a group of actions and an associated collection of settings. On execution of the customized and execution code segments, the configuration process can perform a first action to register product license data included in the first encrypted data block, a second action to initiate processes that, based on the associated collection of settings, acquire additional enabling data associated with the product license data and execution of the customized and executable code segments.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: in response to downloading an intelligent activation key, instantiating an edge configuration engine comprising a listening process and a configuration process, creating and associating a license file vault instance with the edge configuration engine, initiating the listening process; and based on the listening process detecting that a change has occurred with the license file vault, initiating the configuration process, wherein the configuration process configures edge computing equipment to retrieve enabling data used to activate a product associated with the intelligent activation key and enumerated in the license file vault.

In regard to the foregoing, the edge configuration engine can be a virtual machine instantiation that can be operational on edge computing equipment associated with a dark site networking operator entity. Also, the intelligent activation key can comprise a first encrypted data block comprising product license data and a second encrypted data block comprising edge configuration data, wherein the edge configuration data can be used by the edge configuration engine to access the enabling data from original equipment manufacturer network equipment that can be accessible from a publicly accessible internet network segment.

Now in reference to the Figures. FIG. 1 depicts a system 100 that generates and supplies edge configuration aware license keys for use by resource sharing server equipment, in accordance with various example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise key generation engine 102 that can be in operative communication with processor 104, memory 106, and storage 108. Key generation engine 102 can be in communication with processor 104 for facilitating operation of computer-executable instructions or machine-executable instructions and/or components by key generation engine 102, memory 106 for storing data and/or computer-executable instructions and/or machine-executable instructions and/or components, and storage 108 for providing longer term storage of data and/or machine-readable instructions and/or computer-readable instructions. Additionally, system 100 can also receive input 110 for use, manipulation, and/or transformation by key generation engine 102 to produce one or more useful, concrete, and tangible result, and/or transform one or more articles to different states or things. Further, system 100 can also generate and output the useful, concrete, and tangible result and/or the transformed one or more articles as output 112.

System 100 in conjunction with key generation engine 102 can receive as input 110 a command to commence building resource sharing server equipment and/or developing software product to control and manage the resource sharing server equipment. Key generation engine 102, in some embodiments, prior to shipping an agreed upon resource sharing server equipment to one or more customer/client geographical locations, can generate license file data for each ordered software package/product associated with resource sharing server equipment conforming with the contractual agreement, and for the agreed upon resource sharing server equipment conforming to the customer/client's specification. In additional and/or alternative embodiments, key generation engine 102, contemporaneously with shipping the agreed upon resource sharing server equipment to customer/client geographical locations, can generate license file data for all the ordered software package/products associated with resource sharing server equipment conforming with the contractual agreement, as well as the agreed upon resource sharing server equipment conforming to the customer/client's specification. Key generation engine 102 in alternative and/or additional embodiments can generate license file data once the resource sharing server equipment and associated software products have been delivered to the customer/client geographical location and subsequent to the a client/customer identity representing the client/customer entity transmitting, via client/customer equipment, that the shipped resource sharing server equipment and associated software has been received at the various specified geographical locations in good order.

Key generation engine 102, in some implementations, can generate a first pair of encryption key values comprising a first public key value and an associated first private key value. Key generation engine 102, in other embodiments, can generate a second pair of encryption key values comprising a second public key value and an associated second private key value. Key generation engine 102, in some embodiments, can generate edge configuration file data comprising embedded executable code instructions necessary to facilitate configuration of edge computing equipment at the client/customer site.

Figure 7:
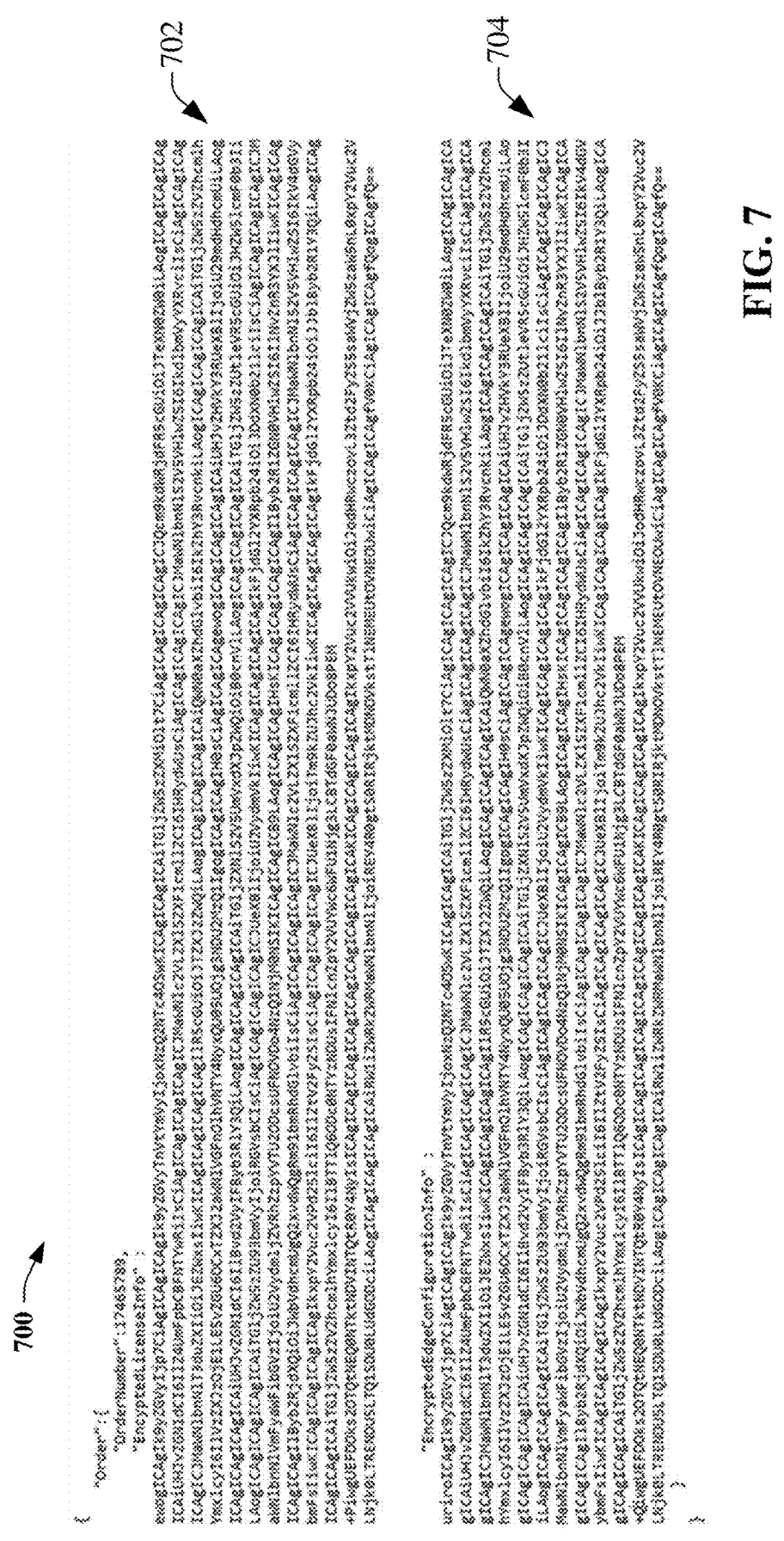

Thereafter, key generation engine 102, can encrypt the license file data using one of the first pair of encryption key values (e.g., the first public key value). The now encrypted license file data can comprise a first encrypted block 702, which in reference to FIG. 7, can be labeled as: "EncryptedLicenseInfo." Key generation engine 102 can also encrypt edge configuration file data comprising embedded executable code instructions using one of the second pair of encryption key values (e.g., the second public key value). The now encrypted edge configuration file data can comprise a second encrypted block 704 that is represented in FIG. 7 and labeled as: "EncryptedEdgeConfigurationInfo."

Key generation engine 102 can join or combine the the encrypted license file data comprising the first encrypted block 702 and the encrypted edge configuration file data comprising the second encrypted block 704 to create an intelligent activation key (e.g., an edge configuration aware license key). The intelligent activation key can be a unique key and can be based, for example, on the specific agreed upon resource sharing server equipment specifications, the media access control (MAC) address (e.g., a unique identifier assigned to a network interface controller associated with networked equipment), the various combination and permutations of each of the OEM produced software associated with the ordered resource sharing server equipment, and the like. In regard to the generated intelligent activation key, it should be noted that the described intelligent activation key enables automatic configuration of edge computing equipment at a customer/client remote location, such as dark site customer/client entity geographical locations, without, for example, the need for access, via one or more wired and/or wireless networking modality, to OEM equipment. Further, one should observe, the intelligent activation key can obviate the necessity for intermediate interactive agent instantiation representations, shipped with the product (e.g., physical and/or software product), to facilitate negotiation and additional unnecessary interaction between OEM equipment and the shipped resource sharing server equipment for purposes of installing, configuring, and/or enabling the one or more facilities and/or functionalities of both the ordered physical and/or associated software products. Moreover, the disclosed intelligent activation key, that is a single license key file (or single license key data), comprises double key encrypted pair blocks (e.g., a first encrypted block 702 representative of encrypted license file data, and a second encrypted block 704 representing an encrypted edge configuration file data, wherein the first encrypted block 702, on being decrypted, is used for licensed product feature enablement, and the second encrypted block 704, on being decrypted, is used for configuration of edge computing equipment situated at the customer/client site.

Once the ordered physical resource sharing server equipment and/or its associated developed, possibly bespoke, software product packages have been delivered to the specified customer/client site, in near contemporaneity with the dispatch of the physical resource sharing server equipment and/or its associated software product packages, key generation engine 102 can send or transmit a generated indication/notification to client/customer equipment notifying a customer identity associated with the client/customer entity that the ordered physical resource sharing server equipment and/or its associated software product packages have been shipped to the client/customer identified destination. Further, key generation engine 102 can provide the customer identity detailed data representing information regarding how the customer identity can facilitate download and/or retrieval of the generated intelligent activation key. Furthermore, the detailed data conveyed to the customer identity can also include procedures that need to be followed, for example, in regard to the physical setup of the resource sharing server equipment and the initial installation of the associated software product packages. When the customer identity downloads the intelligent activation key, bundled together with the intelligent activation key can be the first private key value associated with the first pair of encryption key values, and the second private key value associated with the second pair of encryption key values.

Figure 2:
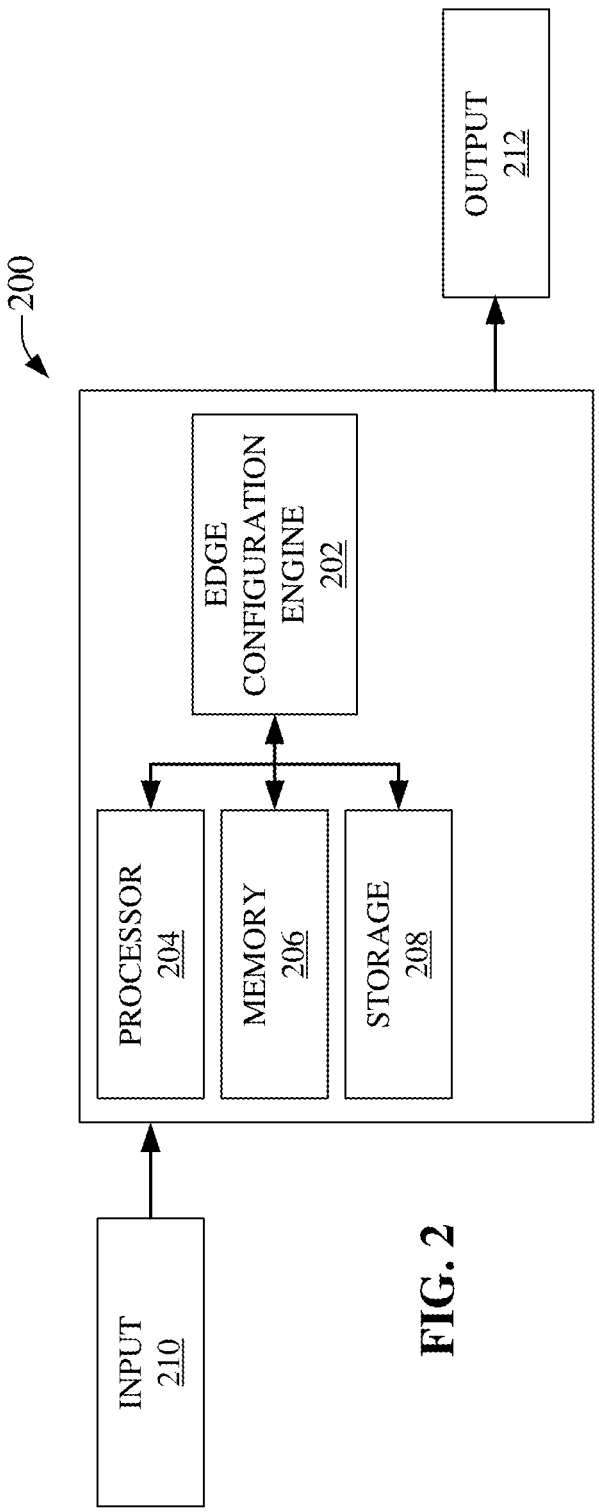
FIG. 2 depicts a block diagram of a system for generating and supplying edge configuration aware license keys for use by resource sharing server equipment, in accordance with various non-limiting example embodiments.

With reference to FIG. 2 depicted therein is system 200 that generates and supplies edge configuration aware license keys for use by resource sharing server equipment, in accordance with various example embodiments. System 200 can be situated at the customer/client location, and can be representative of edge computing equipment associated with the customer/client entity. System 200, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 200 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 200 can comprise edge configuration engine 202 that can be in operative communication with processor 204, memory 206, and storage 208. Edge configuration engine 202 can be in communication with processor 204 for facilitating operation of computer-executable instructions or machine-executable instructions and/or components by edge configuration engine 202, memory 206 for storing data and/or computer-executable instructions and/or machine-executable instructions and/or components, and storage 208 for providing longer term storage of data and/or machine-readable instructions and/or computer-readable instructions. Additionally, system 200 can also receive input 210 for use, manipulation, and/or transformation by edge configuration engine 202 to produce one or more useful, concrete, and tangible result, and/or transform one or more articles to different states or things. Further, system 200 can also generate and output the useful, concrete, and tangible result and/or the transformed one or more articles as output 212.

Edge configuration engine 202, in response to, or based on, a customer identity downloading an intelligent activation key and thereafter activating the intelligent activation key, for example, on the recently shipped and received resource sharing server equipment can instantiate or create a license file vault associated with the customer/client entity. The license file vault can be created in memory 206 and/or storage 208. In some embodiments, edge configuration engine 202, in response to, or based on, the customer identity downloading and activating the intelligent activation key on the recently received resource sharing server equipment can create the license file in a storage area associated with the recently received resource sharing server equipment. In some alternative and/or additional embodiments, edge configuration engine 202, in response to the customer identity having downloaded and activated the intelligent activation key, can create the license file vault on disk storage associated with other networking equipment or database equipment (e.g., alternative computing equipment that a customer/client entity can have designated for the purpose of persisting and/or managing license file vaults).

Edge configuration engine 202, contemporaneously, or in close contemporaneity, with either the downloading of the intelligent activation key and/or in response to activation of the intelligent activation key, can instantiate an edge configuration process. It should be observed, without loss of generality, that in some embodiments the edge configuration process can be a virtual machine instance of edge configuration engine 202, and as such the following exposition refers to the "edge configuration process" as being a virtual machine instantiation of the edge configuration engine 202. The product coding for instantiations of the edge configuration engine/process can have been downloaded, bundled with: the intelligent activation key; one or more of the first pair of encryption key values comprising the first public key value and/or the first private key value; and/or one or more of the second pair of encryption key values comprising the second public key value and/or the second private key value.

One of the tasks associated with edge configuration engine 202 is to monitor and listen for changes that can occur within the license file vault (e.g., changes to one or more data structure-file structures, hierarchical trees, tuples, arrays, linked lists, hash tables, stacks and queues, clusters, tries, and similar structures—that have been persisted to the license file vault). The license vault can be used as a repository for all licenses associated with both the physical computing and networking equipment associated with the customer/client entity, and each and every software product that is licensed for operation on the aforementioned physical computing and networking equipment.

Thus, edge configuration engine 202 can detect and/or determine that there have been changes to the license file vault. Edge configuration engine 202, in response to the determined and/or detected changes to the license file vault, can identify the existence of the new product (e.g., whether new physical resource sharing server equipment and associated software product(s) have appeared in the license file vault), and based at least on the appearance of the new product(s) in the license file vault, edge configuration engine 202 can undertake other tasks such as reading the bundled first private key value associated with the first pair of encryption key values, and/or reading the bundled second private key value associated with the second pair of encryption key values.

Edge configuration engine 202 can use the second private key value to decrypt the second encrypted block 704 included in the intelligent activation key. The second encrypted block 704 can represent encrypted edge configuration file data (e.g., with reference to FIG. 7—"EncryptedEdgeConfigurationInfo"). At this juncture, it should be noted that edge configuration engine 202 can be cognizant that the intelligent activation key has been formatted in accordance with a first defined format. Similarly, edge configuration engine 202 can be aware that each of the first block data and/or the second block data, prior to respective encryptions using respective public keys, can have been respectively formatted, for example by key generation engine 102 in FIG. 1, in accordance with second and third defined formats (e.g., the first block data can have been formatted in conformance with a first defined unique format structure, and the second block data can have been formatted in conformance with a second defined unique format structure, wherein the first defined unique format structure and the second defined unique format structure can be different and distinct from one another).

Since edge configuration engine 202 is aware of the various and respective defined format structures that have respectively been utilized to generate the first block data (e.g., encrypted license file data) and/or the second block data (e.g., the encrypted edge configuration data) and having decrypted the second block data using the second private key value, edge configuration engine 202 can commence reading the content of the now unencrypted edge configuration data.

Edge configuration engine 202 can commence reading the edge configuration data and arrive at a first action "Register." At this point edge configuration engine 202 can marshal all the details needed to perform the actions detained under the "Register" heading. Edge configuration engine 202, on further reading of the edge configuration data, can come upon a second action "Telemetry." On reaching the second action "Telemetry." edge configuration engine 202 can use the attributes under the "Telemetry" tag to configure for Telemetry. Edge configuration engine 202, on additional reading of the edge configuration data, can arrive at a third action denoted as "Policy." Edge configuration engine 202 can use the attributes under this heading to set the customer consensus and restrict the maximum backup.

After performing the foregoing actions, edge configuration engine 202, if necessary, based on whether the customer consensus has been signed or not, can transmit this data back to the OEM entity.

Figure 3:
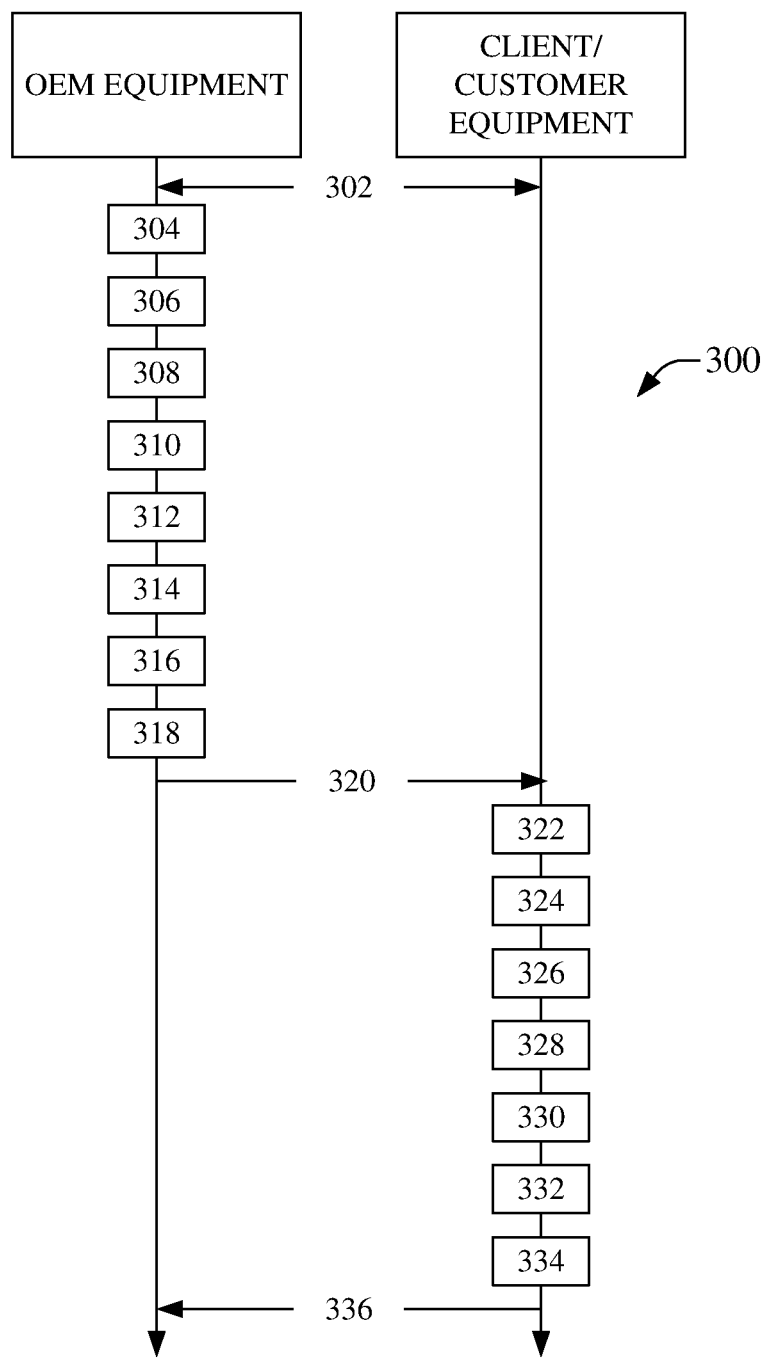
FIG. 3 illustrates a time sequence chart or a method for generating and supplying edge configuration aware license keys for use by resource sharing server equipment, in accordance with various non-limiting example embodiments.
Figure 4:
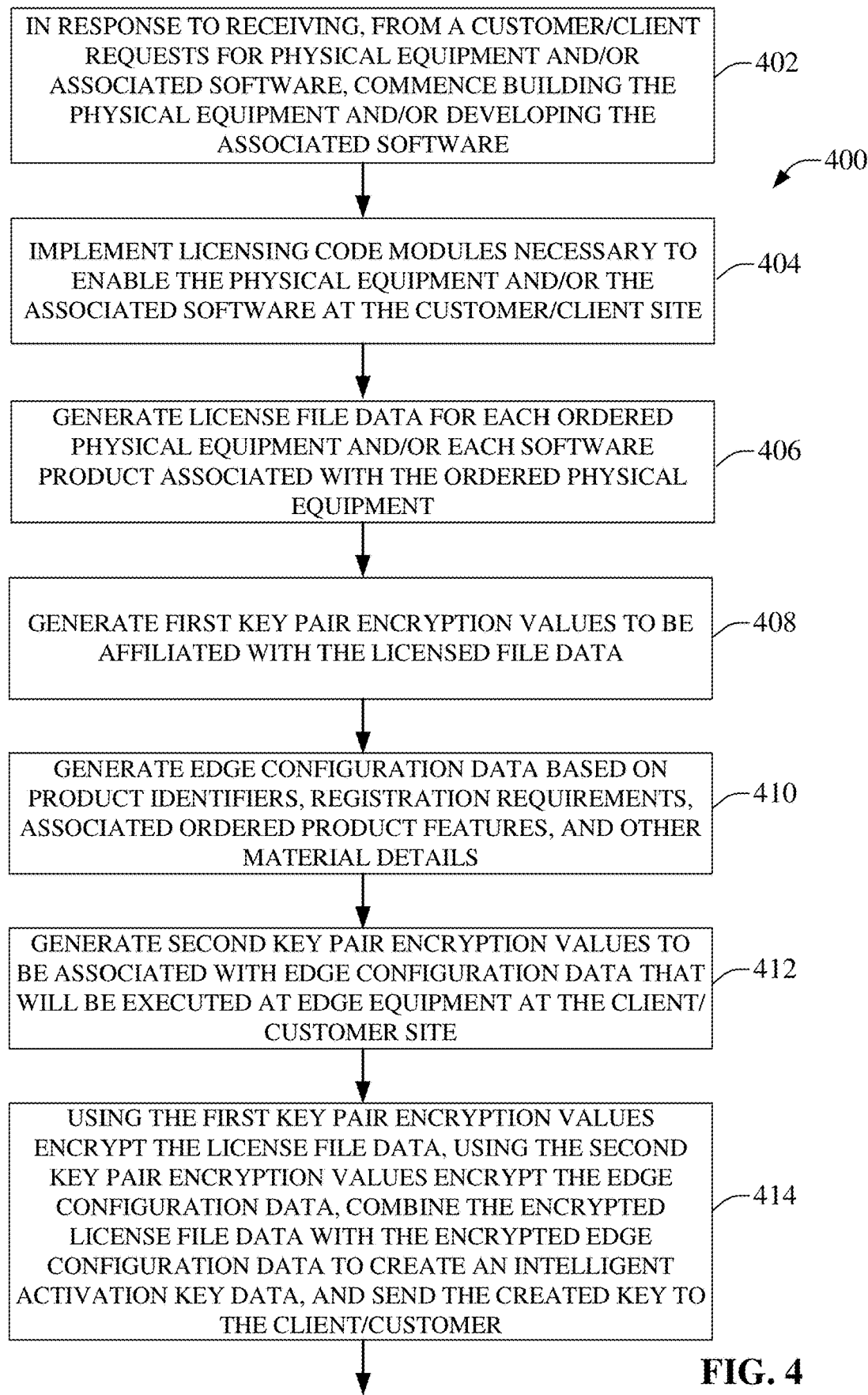
FIG. 4 illustrates yet a further flow chart or a method for generating and supplying edge configuration aware license keys for use by resource sharing server equipment, in accordance with various non-limiting example embodiments.
Figure 5:
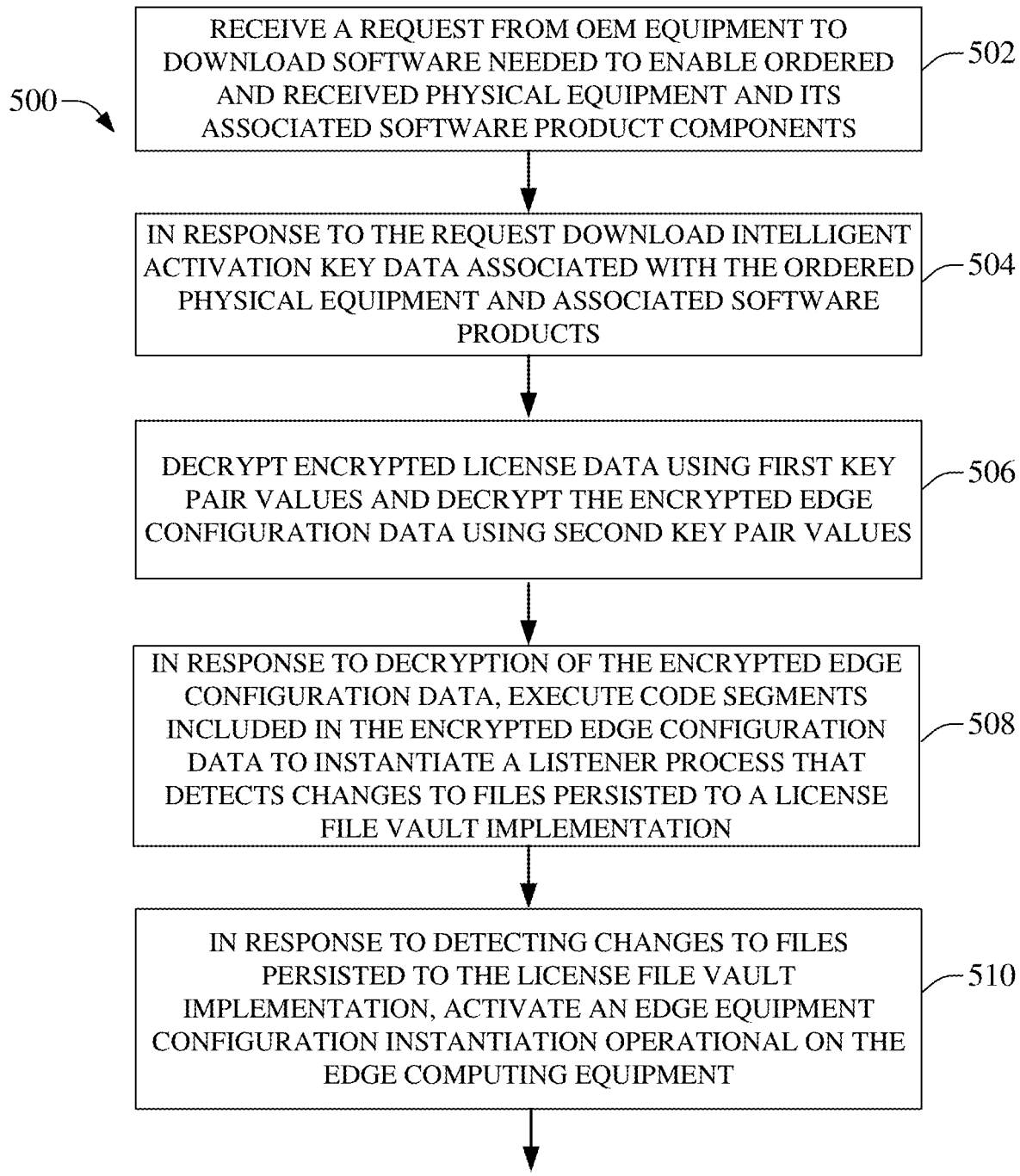
FIG. 5 depicts a further flow chart or a method for generating and supplying edge configuration aware license keys for use by resource sharing server equipment, in accordance with various non-limiting example embodiments.

FIGS. 3-5 illustrate flowcharts, time sequences, and/or methodologies for performing operations corresponding to system 100 and system 200, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 3 depicts a time-sequence diagram or flow diagram 300 for generating and supplying edge configuration aware license keys for use by resource sharing server equipment, in accordance with various detailed implementations and/or described embodiments. The time-sequence can commence at act 302 where a customer or client identity associated with a customer or client entity, through client/customer equipment interacting with original equipment manufacturer (OEM) equipment, negotiates with sales representatives representing as agents of an OEM entity for the purchase, lease, rental, and/or lease to own of resource sharing server equipment. Once agreements concerning the contractual terms associated with the purchase, lease, rental, and/or lease to own of the resource sharing server equipment have been settled, at act 304, a directive can be issued to OEM manufacturing facilities for the resource sharing server equipment to be built in accordance with the customer/client entity's specifications, and the associated and related software code modules necessary to appropriately enable the facilities and/or functionalities of the resource sharing server equipment to be developed.

At act 306, in accordance with one or more embodiments, prior to shipping the agreed upon resource sharing server equipment to customer/client geographical locations, license file data for each ordered software package/product associated with resource sharing server equipment conforming with the contractual agreement, and for the agreed upon resource sharing server equipment conforming to the customer/client's specification can be generated. Additionally and/or alternatively, in other embodiments at act 306, contemporaneously with shipping the agreed upon resource sharing server equipment to customer/client geographical locations, license file data for all the ordered software package/product associated with resource sharing server equipment conforming with the contractual agreement, as well as the agreed upon resource sharing server equipment conforming to the customer/client's specification can be generated. In alternative and/or additional embodiments and/or implementations, at act 306, the foregoing license file data can be generated once the resource sharing server equipment and associated software products have been delivered to the customer/client geographical location and subsequent to the a client/customer identity representing the client/customer entity transmitting, via client/customer equipment, that the shipped resource sharing server equipment and associated software has been received at the various specified geographical locations in good order.

At act 308, in some implementations, a first pair of encryption key values comprising a first public key value and an associated first private key value can be generated. At act 310, in other embodiments, a second pair of encryption key values comprising a second public key value and an associated second private key value can be generated. At act 312, in some embodiments, edge configuration file data comprising embedded executable code instructions necessary to facilitate configuration of edge computing equipment at the client/customer site can be generated.

Figure 8:
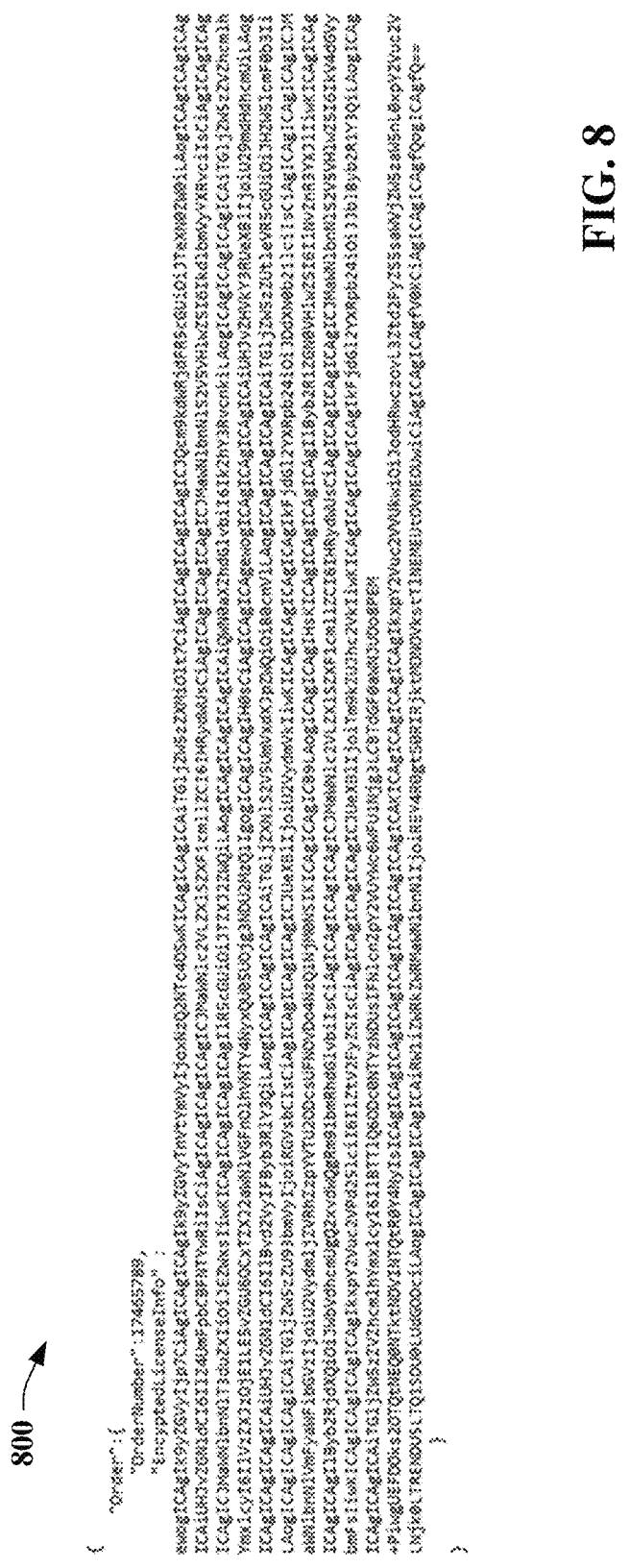

In some embodiments, at act 314, the license file data can be encrypted using one of the first pair of encryption key values (e.g., the first public key value). The encrypted license file data can comprise a first encrypted block 702, which with reference to FIG. 7, is labeled: "EncryptedLicenseInfo." Further at act 314, the edge configuration file data comprising embedded executable code instructions can be encrypted using one of the second pair of encryption key values (e.g., the second public key value). The encrypted edge configuration file data can comprise a second encrypted block 704 that is represented in FIG. 7 and labeled: "EncryptedEdgeConfigurationInfo." It should be noted that FIG. 8 provides better illustration of an example encrypted second block data 800.

At act 316, the encrypted license file data comprising the first encrypted block 702 and the encrypted edge configuration file data comprising the second encrypted block 704 can be combined or joined to form an intelligent activation key (e.g., an edge configuration aware license key). The intelligent activation key can be a unique key and can be based, for example, on the specific agreed upon resource sharing server equipment specifications, the media access control (MAC) address (e.g., a unique identifier assigned to a network interface controller associated with networked equipment), the various combination and permutations of each of the OEM produced software associated with the ordered resource sharing server equipment, and the like. In regard to the generated intelligent activation key, it needs to be noted that the described intelligent activation key enables automatic configuration of edge computing equipment at a customer/client remote location, such as dark site customer/client entity geographical locations, without, for example, the need for access, via one or more wired and/or wireless networking modality, to OEM equipment. Further, the intelligent activation key can obviate the necessity for intermediate interactive agent instantiation representations, shipped with the product (e.g., physical and/or software product), to facilitate negotiation and additional unnecessary interaction between OEM equipment and the shipped resource sharing server equipment for purposes of installing, configuring, and/or enabling the one or more facilities and/or functionalities of both the ordered physical and/or associated software products. Moreover, the disclosed intelligent activation key, that is a single license key file (or single license key data), comprises double key encrypted pair blocks (e.g., a first encrypted block 702 representative of encrypted license file data [e.g., with reference to FIG. 7—"EncryptedLicenseInfo"], and a second encrypted block 704 representing an encrypted edge configuration file data [e.g., with reference to FIGS. 7 and 8—"EncryptedEdgeConfigurationInfo."]), wherein the first encrypted block 702, on being decrypted, is used for product feature enablement, and the second encrypted block 704, on being decrypted, is used for configuration of edge computing equipment situated at the customer/client site.

At act 318, in accordance with some embodiments, the ordered physical resource sharing server equipment and/or its associated developed, possibly bespoke, software product packages can be delivered to the specified customer/client site. In near contemporaneity with the dispatch of the physical resource sharing server equipment and/or its associated software product packages, at act 320, an indication/notification (e.g., shipping invoice with tracking number, etc.) can be generated and transmitted, via OEM manufacturer equipment, to client/customer equipment notifying a customer identity associated with the client/customer entity that the ordered physical resource sharing server equipment and/or its associated software product packages have been shipped to the client/customer identified destination. Further, at act 320, the customer identity can be provided detailed data representing information regarding how the customer identity can facilitate download and/or retrieval the intelligent activation key generated at act 316. Furthermore, the detailed data can also include procedures that need to be followed, for example, in regard to the physical setup of the resource sharing server equipment and the initial installation of the associated software product packages. When the customer identity downloads the intelligent activation key, bundled together with the intelligent activation key can at least be the first private key value associated with the first pair of encryption key values, and at least the second private key value associated with the second pair of encryption key values.

At act 322, in response to, or based on, the customer identity downloading the intelligent activation key and thereafter activating the intelligent activation key, for example, on the recently shipped and received resource sharing server equipment a license file vault, in some embodiments, can be instantiated or created on edge computing equipment associated with the customer/client entity. Similarly, at act 322, in response to, or based on, the customer identity downloading and activating the intelligent activation key on the recently received resource sharing server equipment, in certain embodiments, the license file vault can be created in a storage area associated with the recently received resource sharing server equipment. In alternative and/or additional embodiments, at act 322, in response to the customer identity having downloaded and activated the intelligent activation key the license file vault can be created on disk storage associated with other networking equipment (e.g., alternate computing equipment that the customer/client can have specifically designated for the purpose of managing license file vaults).

At act 324, contemporaneously, or in close contemporaneity, with either the downloading of the intelligent activation key and/or in response to activation of the intelligent activation key, an edge configuration engine (e.g., edge configuration engine 202) can be instantiated or initiated on edge computing equipment associated with the customer/client entity. The product coding for the edge configuration engine can have been downloaded bundled with the intelligent activation key, one or more of the first pair of encryption key values comprising the first public key value and/or the first private key value, and/or one or more of the second pair of encryption key values comprising the second public key value and/or the second private key value.

One of the tasks associated with the edge configuration engine is to monitor and listen for changes that can occur within the license file vault (e.g., changes to one or more data structure—file structures, hierarchical trees, tuples, arrays, linked lists, hash tables, stacks and queues, clusters, tries, and similar structures—that have been persisted to the license file vault). The license vault can be used as a repository for all licenses associated with both the physical computing and networking equipment associated with the customer/client entity, and each and every software product that is licensed for operation on the aforementioned physical computing and networking equipment.

Thus, at act 324, once the edge configuration engine has been established on the edge computing equipment, the edge configuration engine can detect and/or determine that there have been changes to the license file vault. The edge configuration engine, in response to the determined and/or detected changes to the license file vault, can identify the existence of the new product (e.g., whether new physical resource sharing server equipment and associated software product(s) have appeared in the license file vault), and based at least on the appearance of the new product(s) in the license file vault, the edge configuration engine can undertake other tasks such as reading the bundled first private key value associated with the first pair of encryption key values, and/or reading the bundled second private key value associated with the second pair of encryption key values.

At act 326, the edge configuration engine can use the second private key value to decrypt the second encrypted block 704 included in the intelligent activation key. The second encrypted block 704 can represent encrypted edge configuration file data (e.g., with reference to FIGS. 7 and 8—labeled as "EncryptedEdgeConfigurationInfo"). At this juncture, it should be noted that the edge configuration engine can be cognizant that the intelligent activation key has been formatted in accordance with a first defined format. Similarly, the edge configuration engine can be aware that each of the first block data and/or the second block data, prior to respective encryptions using respective public keys, can have been respectively formatted in accordance with second and third defined formats (e.g., the first block data can have been formatted in conformance with a first defined unique format structure, and the second block data can have been formatted in conformance with a second defined unique format structure, wherein the first defined unique format structure and the second defined unique format structure can be different and distinct from one another).

At act 328, since the edge configuration engine is aware of the various and respective defined format structures that have respectively been utilized to generate the first block data (e.g., encrypted license file data) and/or the second block data (e.g., the encrypted edge configuration data) and having decrypted the second block data using the second private key value at act 326, can commence reading the content of the now unencrypted edge configuration data. As depicted in FIG. 9 the unencrypted edge configuration data 900 can comprise a group of settings, instructions, and/or actions that the edge configuration engine can execute to perform one or more operations.

With reference to FIG. 9, the edge configuration data 900 can comprise a product identifier (e.g., ProductID) 902 that can have been assigned an alphanumeric string of characters (e.g., ER8R5S). The product identifier 902, in some embodiments, can be a uniquely generated string that can include both humanly visible characters as well characters generally recognizable by machine (e.g., barcode reader). In other embodiments the product identifier 902 can be a multidimensional barcode, such as a Quick Response (QR) code. In further embodiments, the product identifier 902 can have been generated (e.g., by OEM equipment) based at least in part on a unique identifier assigned to a network interface controller associated with, for example, the shipped resource sharing server equipment. An example of such a unique identifier is a media access control (MAC) address, a randomly generated value generated based on a unique serial number assigned by the OEM entity to its products (e.g., physical hardware and software). An illustrative machine identifier/serial number is depicted at 906 (e.g., "MachineIdentifier" "5PDU7Q"). Additionally and/or alternatively, the product identifier 902 can have been generated based on a value assigned by the OEM entity for commercial transactions with the customer/client entity. For instance, in various embodiments, the value assigned by the OEM entity can have been used as a nonce string in a generated and distributed ledger comprising lists of records that are securely linked together via cryptographic hashes (e.g., a multiparty block chain).

With further reference to FIG. 9, the edge configuration data 900 can also comprise the product features that are to be enabled (e.g., "FeaturesEnabled"). As will be understood by persons having skill in the art, a product, such as resource sharing server equipment, can have a plurality of features, for instance many thousands of petabytes of storage and/or associated software product features needed, for example, to control, monitor, and/or archive and/or restore user data persisted to storage, not all of these product features need to be enabled all at once, or for all the time. For instance, in some implementations, while the resource sharing server equipment can have been shipped to the customer/client with tens of thousands of petabytes of unallocated and available storage, the client/customer entity can have provided remuneration for the use of two terabytes of data allocation. Thus, under the "FeaturesEnabled" heading 904, a first feature ("Feature1") can inform the engine configuration engine that of the plurality of petabytes available on the resource sharing server equipment that only two terabytes are to be available for use by the client/customer entity under the agreed contractual terms. Further, also under the "FeaturesEnabled" head 904, there is a second feature ("Feature2"), this can inform the engine configuration engine that there are other features that can have been purchased by the customer/client entity. For instance, in accordance with certain embodiments, the second feature can relate to an augmented features associated with the first feature. In accordance with other embodiments, the second feature can relate to facilities and/or functionalities associated with groupings of customized software packages that the customer/client entity can have ordered in conjunction with the purchase, lease, or rental of the resource sharing server equipment.

With further reference to FIG. 9, and in particular in regard to edge configuration data 900, it will be observed that the item labeled 908 refers to "UOM," this denotes units of measure (UOM), which, in this instance, has been configured to be megabyte (e.g., "MegaBytes"). Still with regard to edge configuration data 900, there is a telemetry heading 910 (e.g., "Telemetry") this indicates to the edge configuration engine operational on a customer/client edge computing machine, that disk usage 912 (e.g., "Disk Usage") is to be determined and/or measured in units of megabytes, and memory usage 914 (e.g., "MemoryUsage") is also to be determined and/or measure in units of megabytes. It will also be observed in regard to edge configuration data 900 that there is policy section ("Policy") comprising a first field 916 labeled "CustomerConsensus" and a second field 918 labeled "MaxBackup". The first field 916 can be used to obtain agreement from a customer identity associated with the client/customer entity that the customer/client entity is satisfied with the delivery of the delivered physical product (e.g., the resource sharing server equipment) and/or the shipped and delivered affiliated software package(s), and further that the customer/client entity will abide by the various licenses associated with the delivered product. In this instance, the customer/client entity has agreed to the foregoing and as such the first field 916 has been marked "Signed." The second field 918 under the policy section head indicates to the edge configuration engine that the maximum allocation space for backup ("MaxBackup") should be confined to one terabyte ("1 TB").

Now returning back to FIG. 3, at act 330, the edge configuration engine can commence reading the edge configuration data 900, as illustrated in FIG. 9 and described above, and can get to a first action "Register." At this point the edge configuration engine can marshal all the details needed to perform the actions detained under the "Register" heading. A representation of the first action "Register" is depicted as 1000 in FIG. 10. At act 332, the edge configuration engine, on further reading of the edge configuration data 900, can come upon a second action "Telemetry." On reaching the second action "Telemetry," the edge configuration engine can use the attributes under the "Telemetry" tag to configure for Telemetry. A representation of the second action, "Telemetry," is illustrated as 1100 in FIG. 11. At act 334, the edge configuration engine, on additional reading of the edge configuration data 900, can arrive at a third action denoted as "Policy." The edge configuration engine can use the attributes under this heading to set the customer consensus and restrict the maximum backup. An illustrative representation of the third action, "Policy," is depicted as 1200 in FIG. 12.

At act 336, the edge configuration engine, if required or needed, based on whether the customer consensus has been signed or not, can transmit this fact back to the OEM entity.

FIG. 4 illustrates a flowchart or method 400 for generating and supplying edge configuration aware license keys for use by resource sharing server equipment in accordance with various example embodiments. Flowchart or method 400 in various embodiments is intended to be functional and operational on system 100. The flowchart can commence at act 402, wherein in response to receiving, by a system (e.g., system 100), from a customer/client identity associated with the customer/client entity a triggering request for the order of physical equipment and/or associated software, transmitting a requisition for the construction or building of the physical equipment and/or developing the associated software. At act 404, a system, such as system 100, can develop and/or implement licensing and enabling code modules necessary to, on delivery to a customer/client site, license and/or enable the ordered physical equipment and/or the associated software at the customer/client site. At act 406, system 100 can generate license file data for each ordered physical equipment and/or software product associated with the ordered physical equipment. Further, at act 408, system 100 can generate first key pair encryption values to be affiliated with the license file data. At act 410, system 100 can generate edge configuration data based on, for example, product identifiers, registration requirements, associated other ordered product features, and a plurality of further material details. At act 412, system 100, can generate second key pair encryption values to be affiliated with the edge configuration data that eventually will be executed at edge computing equipment located at the client/customer site. At act 414, system 100, can using the first key pair encryption values encrypt the license file data, using the second key pair encryption values encrypt the edge configuration data, combined the now encrypted edge configuration data and encrypted license file data to create intelligent activation key data, and then send the intelligent activation key data to the client/customer.

FIG. 5 illustrates a flowchart or method 500 for generating and supplying edge configuration aware license keys for use by resource sharing server equipment in accordance with various example embodiments. Method 500 can commence at act 502, wherein a system (e.g., system 200) can receive a request from OEM equipment to download a bundle of software and associated license keys needed to enable ordered and received physical equipment and associated developed software packages. At act 504, in response to receiving the request, system 200, can download intelligent activation key data associated with the ordered physical equipment and associated software packages. At act 506, system 100, can decrypt the encrypted license key data using first key pair values and decrypt the encrypted edge configuration data using second key pair values. At act 508, in response to decrypting the encrypted edge configuration data, system 200 can execute machine executable code instructions embedded in the edge configuration data to instantiate a listener process on edge computing equipment situated and/or operational at, and associated with, the client/customer entity. The listener process, for example, can be a process executing and operational in the context of an edge configuration engine operational on edge computing equipment associated with the client/customer. It should be noted that in some embodiments the edge configuration engine itself can be established as a virtual machine (VM) instantiation initiated in response to decryption of the edge configuration data using the second key pair values. The listener process initiated at act 508 can be used to detect changes to file representations associated with licensed products operational on and/or equipment associated with the client/customer entity, wherein the file representations can have been persisted to a license vault implementation. At act 510, in response to detecting changes to the file representations included in the license file vault implementation, system 200 can activate an edge equipment configuration instantiation (e.g., edge configuration engine) to be operational on the edge computing equipment associated with the client/customer entity.

Figure 6:
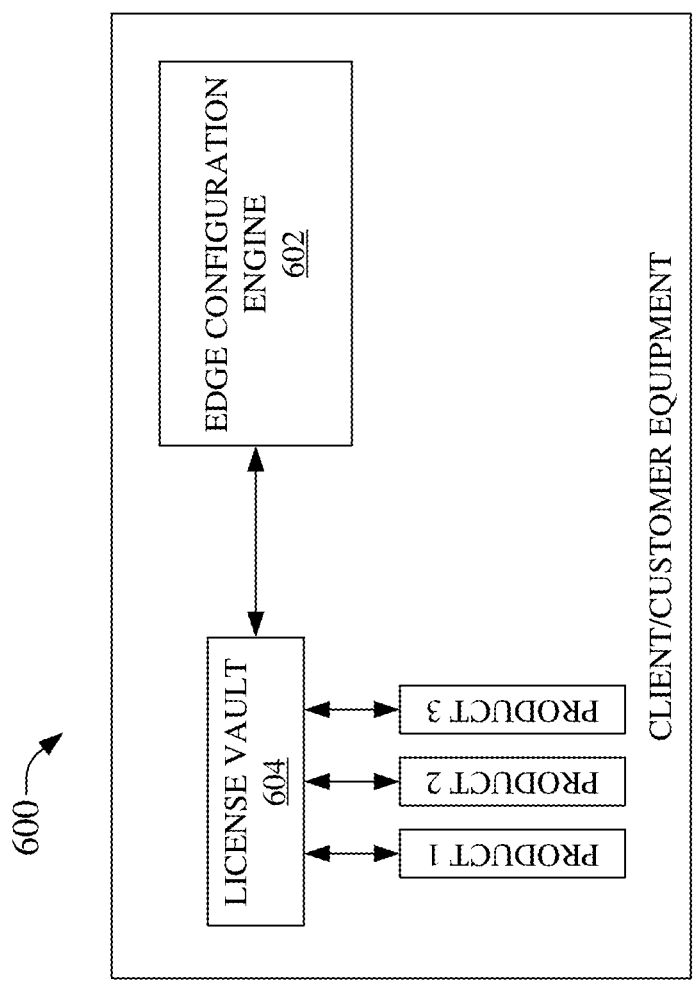
FIG. 6 illustrates edge computing equipment on which an edge configuration engine instance and associated license vault instance are operational for the generation and supply of edge configuration aware license keys for use by resource sharing server equipment, in accordance with various non-limiting example embodiments.

FIG. 6 illustrates an example edge computing equipment 600 on which, for example, a virtual machine (VM) edge equipment configuration engine 602 instantiation is operational in accordance with the description set forth herein. Also depicted in FIG. 6 is illustration of the license vault implementation. As illustrated, there are three products that have been licensed and are being monitored, using a listener process generated and/or monitored by edge equipment configuration engine 602.

Figure 13:
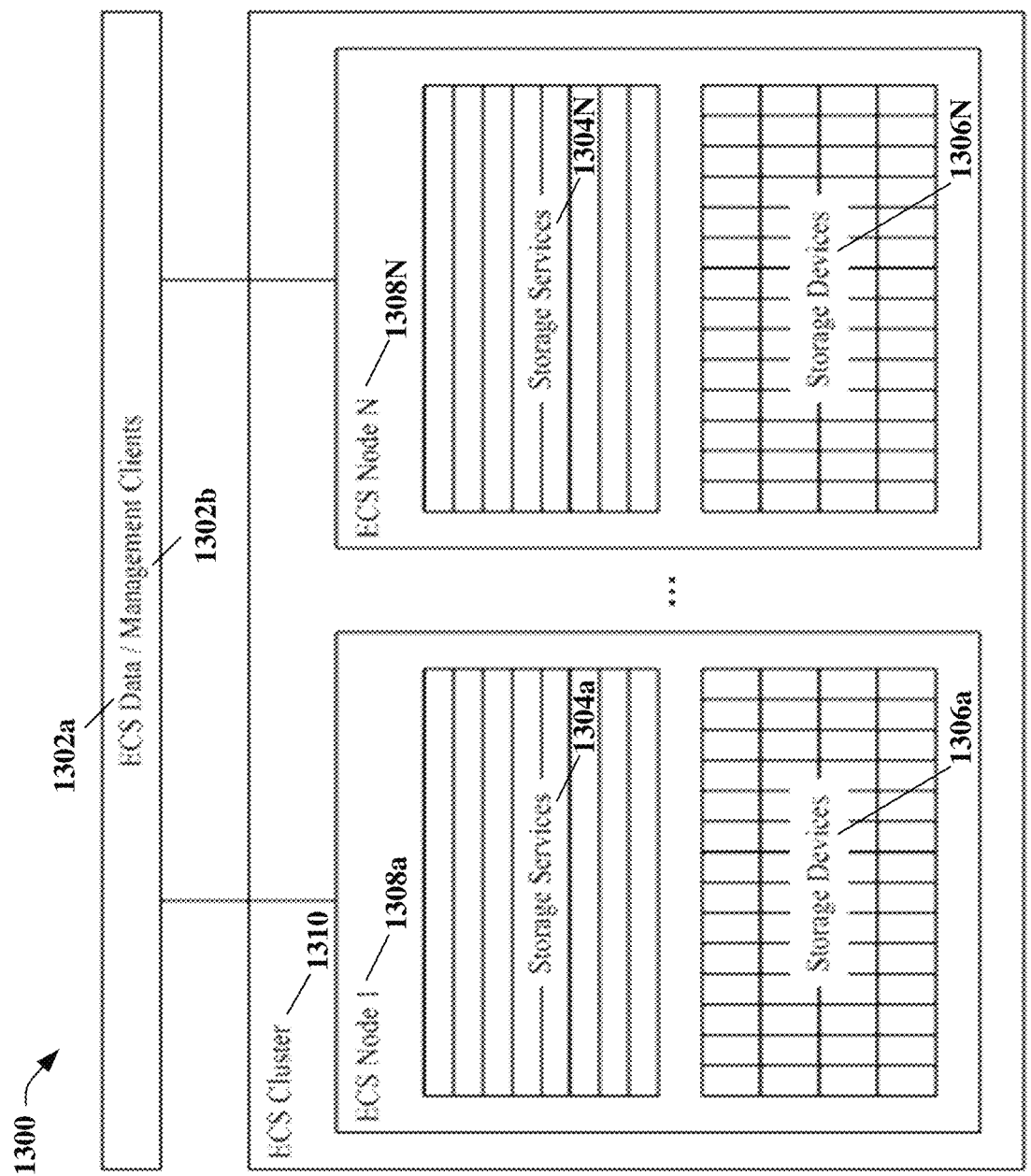
FIG. 13 illustrates an elastic cloud storage (ECS) system, in accordance with various non-limiting example embodiments.

In the following, FIG. 13 describes an example non-limiting cloud storage system in the non-limiting context of an ECS storage system, but for the avoidance of doubt, the subject embodiments can apply to any storage platform. For instance, in this regard, FIG. 13 illustrates an ECS storage system 1300 comprising a cloud-based object storage appliance in which corresponding storage control software comprising, e.g., ECS data client(s) 1302a, ECS management client(s) 1302b, storage service(s) 1304a ... 1304N, etc. and storage devices 1306a ... 1306N (e.g., storage media, such as physical magnetic disk media, etc. of respective ECS nodes of ECS cluster 1310) are combined as an integrated system with no access to the storage media other than through the ECS storage system 1300.

In this regard, ECS cluster 1310 comprises multiple nodes 1308a ... 1308N, storage nodes, ECS nodes, etc. Each node is associated with storage devices 1306a ... 1306N, e.g., hard drives, physical disk drives, storage media, etc. In embodiment(s), ECS node 1308a, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 1300 can be an append-only virtual storage platform that protects content from being erased or overwritten for a specified retention period. In particular, the ECS storage system 1300 does not employ traditional data protection schemes like mirroring or parity protection. Instead, the ECS storage system 1300 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 1300 can support storage, manipulation, and/or analysis of unstructured data on a massive scale on commodity hardware. As an example, the ECS storage system 1300 can support mobile, cloud, big data, and/or social networking applications. In another example, the ECS storage system 1300 can be deployed as a turnkey storage appliance, or as a software product that can be installed on a set of qualified commodity servers and disks, e.g., within a node, data storage node, etc. of a cluster, data storage cluster, etc. In this regard, the ECS storage system 1300 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD)

or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by variance engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1422, disk storage 1424, and/or memory storage 1446, further description of which is below. For instance, nonvolatile memory can be included in read only memory (ROM), programmable ROM (PROM), electrically programmable ROM (EPROM), electrically erasable ROM (EEPROM), or flash memory. Volatile memory 1420 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 14:
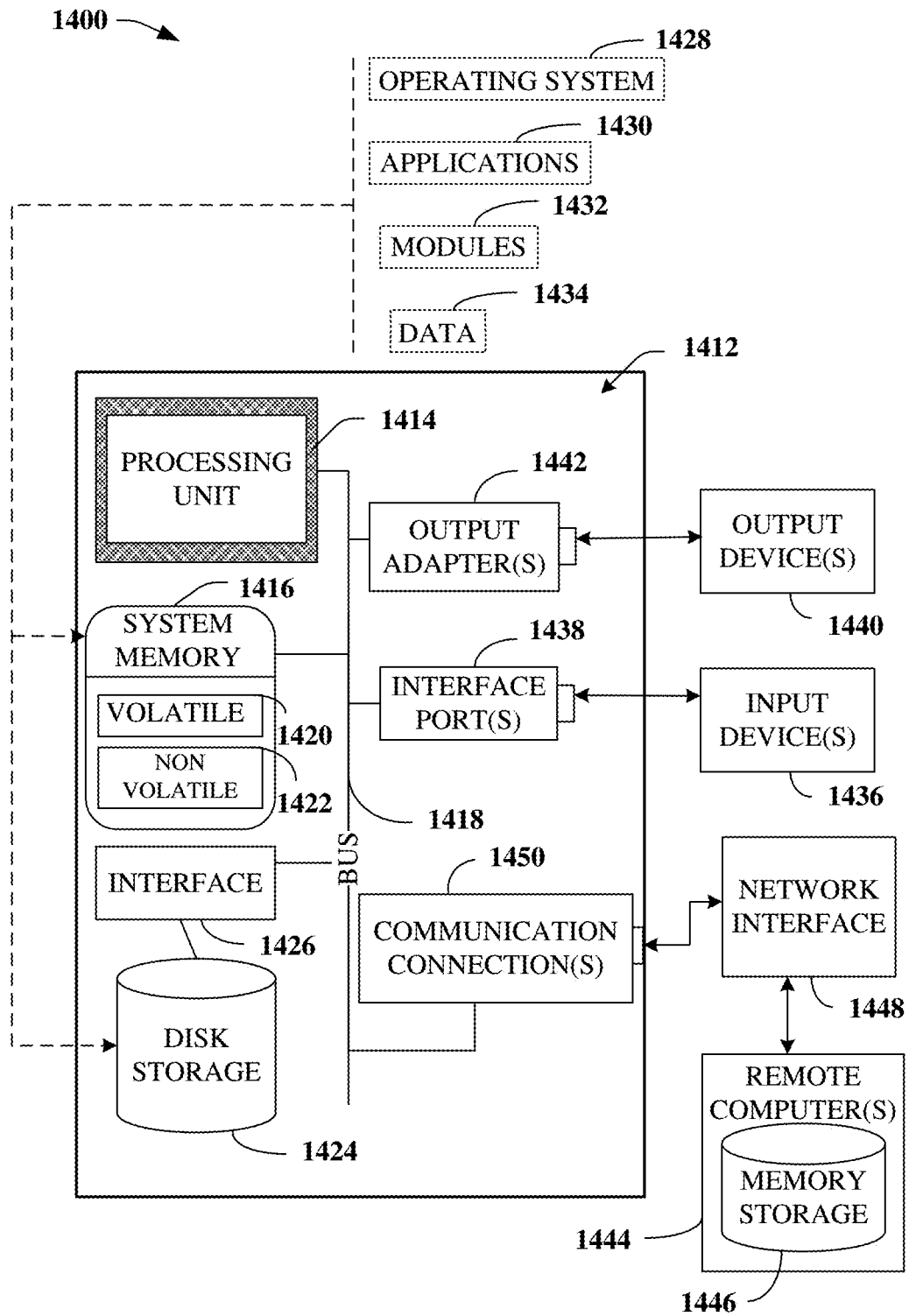
FIG. 14 illustrates a block diagram representing an illustrative non-limiting computing system or operating environment in which one or more aspects of various non-limiting embodiments described herein can be implemented.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 14, a block diagram of a computing system 1400, e.g., system 140, operable to execute the disclosed systems and methods is illustrated, in accordance with an embodiment. Computer 1412 comprises a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1416 comprises volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can comprise ROM, PROM, EPROM, EEPROM, or flash memory. Volatile memory 1420 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also comprises removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, Jaz drive, Zip drive, LS-100 drive, flash memory card, or memory stick. In addition, disk storage 1424 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

It is to be appreciated that FIG. 14 describes software that acts as an intermediary between users and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user can enter commands or information into computer 1412 through input device(s) 1436. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1414 through system bus 1418 via interface port(s) 1438. Interface port(s) 1438 comprise, for example, a serial port, a parallel port, a game port, a universal serial bus (USB), a wireless based port, e.g., Wi-Fi, Bluetooth, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440, like display devices, light projection devices, monitors, speakers, and printers, among other output devices 1440, which use special adapters. Output adapters 1442 comprise, by way of illustration and not limitation, video and sound devices, cards, etc. that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, a workstation, a microprocessor based appliance, a peer device, or other common network node and the like, and typically comprises many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically and/or wirelessly connected via communication connection 1450. Network interface 1448 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and DSL modems, wireless modems, ISDN adapters, and Ethernet cards.

The computer 1412 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1412 can connect to other devices/networks by way of antenna, port, network interface adaptor, wireless access point, modem, and/or the like.

The computer 1412 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable instructions that, when executed by the at least one processor, facilitate performance of operations, comprising:
   in response to receiving, from original equipment manufacturer networking equipment, notification to download an intelligent activation key, downloading the intelligent activation key; and
   activating the intelligent activation key, wherein the activating of the intelligent activation key facilitates:
   starting, on edge computing equipment, an edge configuration engine comprising a listening process and a configuration process, and creating and associating a license file vault instance with the edge configuration engine, wherein the edge configuration engine is a virtual machine instantiation operational on the edge computing equipment associated with a dark site networking operator entity;
   initiating, on the edge computing equipment, the listening process; and
   in response to the listening process detecting an occurrence representing a change to the license file vault instance, initiating, on the edge computing equipment, the configuration process.

2. The system of claim 1, wherein the intelligent activation key comprises a first encrypted block of data representing product license data and a second encrypted block of data representing edge configuration data, and wherein the configuration process uses a first pair of encryption key values to decrypt the first encrypted block of data to obtain the product license data and a second pair of encryption key values to decrypt the second encryption block of data to obtain the edge configuration data.

3. The system of claim 2, wherein the first pair of encryption key values and the second pair of encryption key values are bundled with the intelligent activation key.

4. The system of claim 2, wherein the edge configuration data comprises customized executable code fragments comprising a collection of actions that are performed by the configuration process.

5. The system of claim 2, wherein the configuration process reads the edge configuration data and executes an action representing a directive to register the product license data and associate the product license data with the license file vault.

6. The system of claim 2, wherein the configuration process reads the edge configuration data and executes an action representing an action to start processes, based on telemetry data associated with the action, to acquire, via the edge computing equipment, additional data to enable execution of a product associated with the product license data, wherein the edge computing equipment facilitates communication with the original equipment manufacturer network equipment.

7. The system of claim 2, wherein the configuration process reads the edge configuration data and executes an action representing a policy action to obtain an electronic signature from a user representative identity associated with a customer entity.

8. The system of claim 2, wherein the configuration process reads the edge configuration data and executes an action representing a policy action to limit a backup of a product to a defined disk space backup size.

9. A method, comprising:
receiving, by a device comprising one or more processors, a notification trigger to download an intelligent activation key;
in response to the notification trigger, downloading, by the device, the intelligent activation key; and
activating, by the device, the intelligent activation key, wherein the activating of the intelligent activation key facilitates:
starting, on edge computing equipment associated with a dark site equipment operator entity, an edge configuration engine comprising a listening process and a configuration process, and creating and associating a license file vault instance with the edge configuration engine;
initiating, on the edge computing equipment, the listening process; and
in response to the listening process detecting an occurrence representing a change to the license file vault instance, initiating, on the edge computing equipment, the configuration process.

10. The method of claim 9, wherein the notification trigger is generated and sent by original equipment manufacturer network equipment.

11. The method of claim 10, wherein the original equipment manufacturer network equipment is accessible via a public internet network infrastructure.

12. The method of claim 9, wherein the device is associated with the dark site equipment operator entity, and wherein a dark site associated with the dark site equipment operator entity is inaccessible to a public internet network infrastructure.

13. The method of claim 9, wherein the intelligent activation key comprises a first encrypted data block, a second encrypted data block, and a group of paired and associated encryption key values.

14. The method of claim 13, wherein the configuration process, using a paired and associated encryption key value of the group of paired and associated key values, decrypts the second encrypted data block and obtains edge configuration data comprising customized and executable code segments.

15. The method of claim 14, wherein the customized and executable code segments represent a group of actions and an associated collection of settings.

16. The method of claim 15, wherein on execution of the customized and execution code segments, the configuration process performs a first action to register product license data included in the first encrypted data block, a second action to initiate processes that based on the associated collection of settings acquire additional enabling data associated with the product license data and execution of the customized and executable code segments.

17. A non-transitory machine-readable medium comprising instructions that, in response to execution, cause a system comprising at least one processor to perform operations, comprising:
in response to downloading an intelligent activation key, instantiating an edge configuration engine comprising a listening process and a configuration process;
creating and associating a license file vault instance with the edge configuration engine;
initiating the listening process; and
based on the listening process detecting that a change has occurred with the license file vault, initiating the configuration process, wherein the configuration process configures edge computing equipment to retrieve enabling data used to activate a product associated with the intelligent activation key and enumerated in the license file vault, wherein the edge configuration engine is a virtual machine instantiation operational on edge computing equipment associated with a dark site networking operator entity.

18. The non-transitory machine-readable storage medium of claim 17, wherein the intelligent activation key comprises a first encrypted data block comprising product license data and a second encrypted data block comprising edge configuration data, wherein the edge configuration data is used by the edge configuration engine to access the enabling data from original equipment manufacturer network equipment, and wherein the original equipment manufacturer network equipment is accessible from a publicly accessible internet network segment.

19. The non-transitory machine-readable storage medium of claim 17, wherein a dark site associated with the dark site equipment operator is inaccessible to a public internet network infrastructure.

20. The non-transitory machine-readable storage medium of claim 17, wherein the downloading of the intelligence activation is initiated by original equipment manufacturer network equipment.

* * * * *